G. T. SMITH.
Hay-Rack.
No. 60,271. Patented Dec 4, 1866
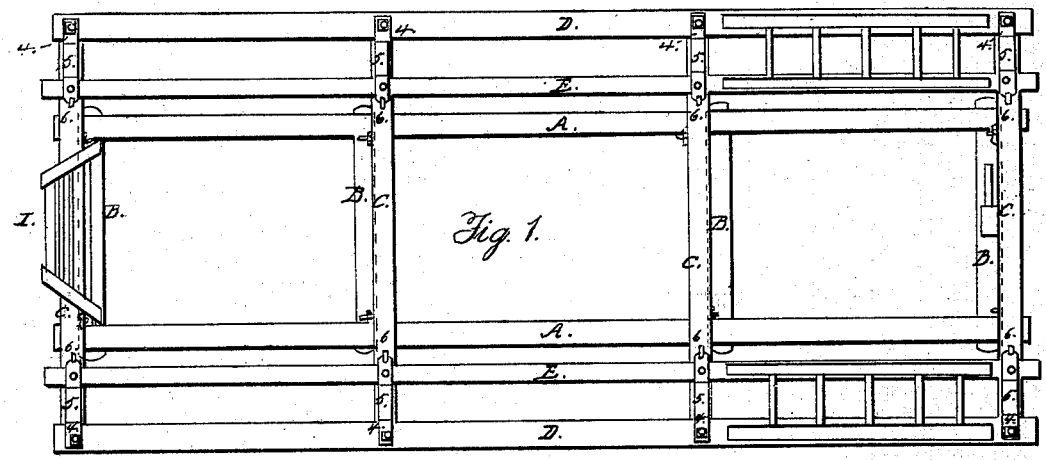
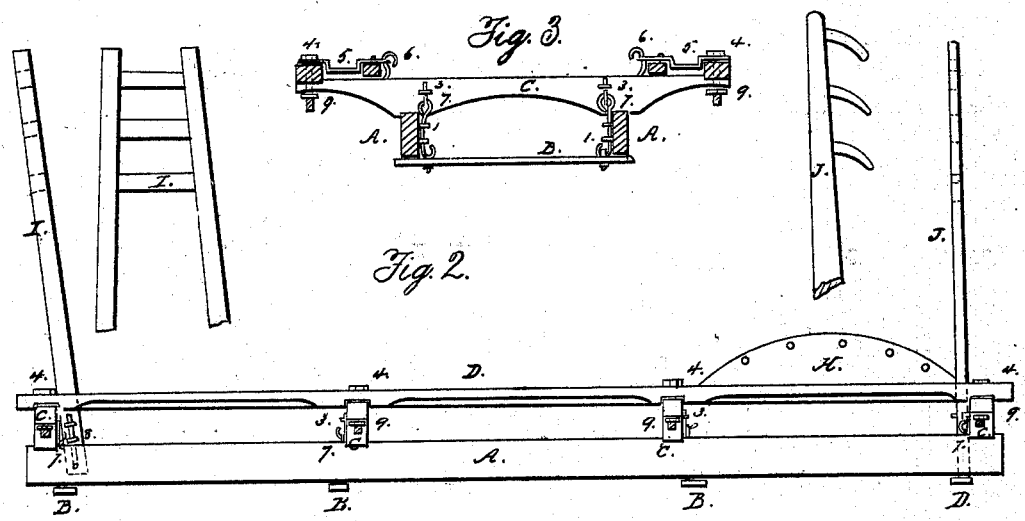
Witnesses:
J. L. Coburn
Inventor:
George T. Smith
by Coburn & ---
Attorneys

United States Patent Office.

IMPROVEMENT IN HAY-RACK FOR WAGONS.

GEORGE Y. SMITH, OF PLAINFIELD, ILLINOIS.

Letters Patent No. 60,271, dated December 4, 1866.

SPECIFICATION.

TO ALL WHOM IT MAY CONCERN:

Be it known that I, GEORGE Y. SMITH, of Plainfield, in the county of Cook, and State of Illinois, have made a new and useful Improvement in Hay-Racks; and I do hereby declare the following to be a full, clear, and exact description of the same, reference being had to the accompanying drawings, and letters and figures marked thereon, which form a part of this specification, and in which—

Figure 1 represents a top or plan view of my improved rack.

Figure 2 a side elevation; and

Figure 3 a transverse sectional view at the red line $x$ in fig. 1.

My invention relates to that class of hay-racks used upon farm-wagons for the purpose of drawing hay, and consists in constructing said racks by connecting the different parts thereof by means of hooks and eyes in such a manner that one person can readily place the rack upon the wagon or remove it therefrom by handling it in pieces.

I construct my hay-rack with two bed-pieces, A A, which rest upon the rockers of the wagon, and are stayed and strengthened by the under cross-pieces B, to which they are attached by means of the hooks and eye-bolts 1, 2, more clearly shown in fig. 3. Above these bed-pieces, and resting upon them, are placed the ordinary cross-beams, C, at suitable distances apart to insure strength and durability. In a rack of ordinary length I usually use four of them. There are notches cut in the under side of the cross-beams C to receive the upper edges of the bed-pieces A A, which serve to keep both the cross-beams and bed-pieces in place, and they are more firmly bound together by means of the hooks 3, which are fastened to the sides of the cross-beams and hook into the eyes 7, said eyes being attached to the bed-pieces A, or connected to the hooks 1, the connecting rods extending through stays that are fastened to the bed-pieces, as shown in fig. 3. The ends of the cross-pieces C extend out over the sides of the wagon, and have placed upon them the raves D and E, which are held in place by means of the strips of iron, 5, there being holes in one end of said strips, which are hooked on to the hooks 6, while the other end passes over the raves D and is secured by the bolts 4, the bolts passing through the ends of the strips, the raves D, and the ends of the cross-pieces C, and secured by the nuts 9. Instead of securing the raves or rails to the outer end of the cross-pieces C, by means of bolts and nuts, as described, there may be oblong holes or slots made in the straps 5, through which pins having corresponding heads pass, entering or screwing into the pieces C, so that by a half turn of said pins the heads thereof will be made to lie across the slots in the strips 5, and so secure the parts together, or by turning the oblong heads in the direction of the slot, the parts may be detached as desired, or the attachment may be made in any other suitable manner. The raves D and E are placed in such a position that the rear wheels of the wagon extend up between and above them, and in order to keep the hay or grain off of the wheels, the wheel-racks H are placed over them and fastened to the raves E and D. I also have removable devices, I and J, which are attached to the front and rear of the rack, as hereafter described, and extend up from said rack as high as you would ordinarily build a load of hay or grain. The front device is constructed with two side-pieces with cross-pieces between them near the top, and are attached to the rack by means of hooks, 8, that are attached to the outside of the side-pieces and spring into recesses in the inner sides of the bed-pieces A. The rear device, J, is constructed of a single standard, with hook-shaped pieces attached to it, and it is attached to the rack by setting the lower end of it into a mortise in the rear bottom cross-piece B, and then by swinging it up against the rear beam C, there is a turn catch, 10, which passes through a slot in said standard, which catch being turned at right angles, holds the said standard in position. Said devices are for the purpose of staying the load of hay or grain, and also to enable the operator to readily bind the load with a pole by simply putting one end of the pole under one of the cross-pieces in the front device and springing the other end of the pole under one of the hook-shaped pieces attached to the rear standard. My rack is removed from the wagon by first removing the devices I and J by simply turning the catch 10 and springing the hooks 8 out of their recesses; then, by taking out the bolts 4, the raves D and E can be removed by turning them upward and inward so as to unhook the straps 5 from the hooks 6; this leaves the beams C free to be turned down on their sides in such a manner as to remove the hooks 3 from the eyes 7, which in turn so relieves the bed-pieces A that they can be turned down so as to unhook the hooks 1 from the eyes 2. By reversing this process the rack is readily placed upon the wagon ready for use. The eye-bolts 2 have nuts beneath the bottom cross-pieces B, by tightening which the said cross-pieces, the bed-pieces A, and the beams C, are bound more firmly together.

Having thus fully described the construction and operation of my improved rack, what I claim as my invention, and desire to secure by Letters Patent, is—

1. The combination and arrangement of the hooks 1 and eye or eye-bolt 2, with the cross-pieces B, and bed-pieces A, substantially as and for the purposes described.

2. The combination and arrangement of the hooks 3 and eyes 7, with the beams C and bed-pieces A, substantially as and for the purposes set forth.

3. The combination and arrangement of the hooks 6, the straps 5, bolts 4, with the beams C and raves D and E, when constructed and operating substantially as and for the purpose described.

G. Y. SMITH.

Witnesses:
W. E. MARRS,
JOHN R. SMITH.